US006322653B1

(12) United States Patent
Blomqvist et al.

(10) Patent No.: US 6,322,653 B1
(45) Date of Patent: Nov. 27, 2001

(54) METHOD FOR JOINING SPIRAL WOUND PIPES

(75) Inventors: Gunnar Blomqvist, Helsingby; Stefan Slotte; Anders Andtbacka, both of Vasa, all of (FI)

(73) Assignee: Oy Kwh Pipe Ab, Vasa (FI)

( * ) Notice: Subject to any disclaimer, the term of this patent is extended or adjusted under 35 U.S.C. 154(b) by 0 days.

(21) Appl. No.: 09/343,685

(22) Filed: Jun. 30, 1999

(51) Int. Cl.[7] .................................................. B29C 65/22
(52) U.S. Cl. .................... 156/221; 156/224.19; 156/245; 156/258; 156/274.2; 156/304.2; 156/304.3; 156/304.6; 264/138; 264/152; 264/249; 264/449; 264/DIG. 46; 285/21.2
(58) Field of Search ...................................... 264/249, 449, 264/138, DIG. 46, 152; 156/158, 223.9, 274.2, 304.2, 304.3, 304.6, 221, 244.19, 245, 258; 425/508, DIG. 13; 285/21.2, 288.11

(56) References Cited

U.S. PATENT DOCUMENTS

| | | | |
|---|---|---|---|
| 3,378,672 | 4/1968 | Blumenkranz | 219/200 |
| 4,365,144 | * 12/1982 | Reich et al. | 219/535 |
| 5,053,097 | * 10/1991 | Johansson et al. | 156/158 |
| 5,320,697 | * 6/1994 | Hegler et al. | 156/158 |
| 5,362,112 | * 11/1994 | Hamilton et al. | 285/110 |
| 5,362,114 | * 11/1994 | Levingston | 285/334 |
| 5,407,520 | * 4/1995 | Butts et al. | 156/379.7 |
| 5,410,131 | 4/1995 | Brunet et al. | 219/535 |
| 5,415,440 | 5/1995 | Kanao | 285/295 |
| 5,431,762 | 7/1995 | Blomqvist | 156/158 |
| 5,478,123 | * 12/1995 | Kanao | 285/289 |
| 5,591,292 | * 1/1997 | Blomqvist | 156/244.13 |
| 5,770,006 | * 6/1998 | Andrew et al. | 156/449 |
| 5,772,824 | * 6/1998 | Steinmetz et al. | 156/158 |
| 5,836,621 | * 11/1998 | Campbell | 285/21.2 |

FOREIGN PATENT DOCUMENTS

| | | |
|---|---|---|
| 197 18 790 A1 | 11/1998 | (DE). |
| WO 97/01433 | 1/1997 | (WO). |

* cited by examiner

Primary Examiner—Jan H. Silbaugh
Assistant Examiner—Stefan Staicovici
(74) Attorney, Agent, or Firm—Connolly Bove Lodge & Hutz LLP

(57) ABSTRACT

A method for joining thermoplastic pipes made by spiral winding a hollow profile with mainly rectangular cross section. The method includes: cutting an end of the pipe along an inside of a profile side wall fastened to a nearest preceding wound round of said profile and with a section cutting an outermost end of the profile in a right or obtuse angle, or equal size for all pipe ends to be joined together; closing hole in such cut profile ends, and preparing end surfaces of the pipes along their entire peripheries; positioning two pipes in alignment with each other; inserting a welding ring, having dimensions matching with the inner and outer diameters of the pipes, between the two pipes; the welding ring comprising at least one loop of a resistance wire covered by a thermoplastic sleeve, aligning the two pipes with an inner root support and an outer root support, pressing the pipe ends together against each other; connecting the resistance wire of the welding ring to a current source to heat the thermoplastic materials in the welding ring and in the pipe ends so that the thermoplastic materials melt and form a welding seam, cooling the welding seam; removing the root supports and other accessories from the pipe welded together, and cutting off the connecting wires of the welding ring.

10 Claims, 4 Drawing Sheets

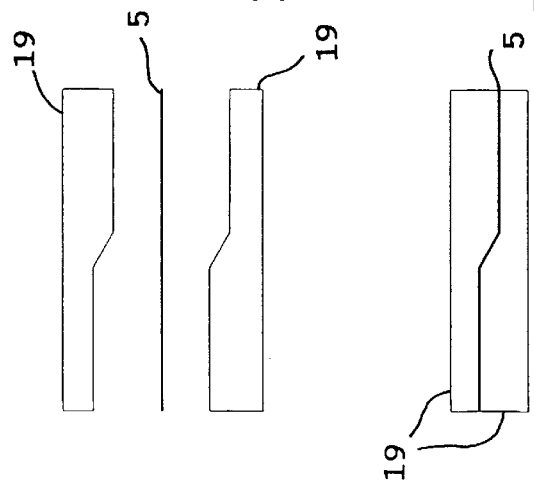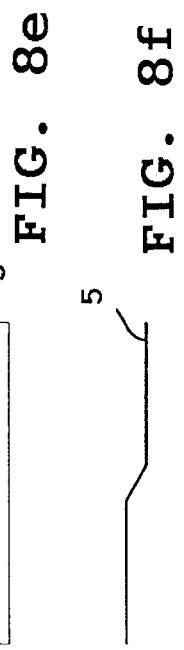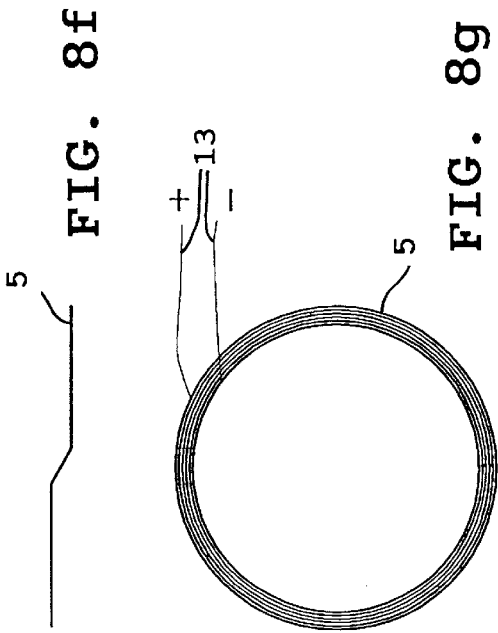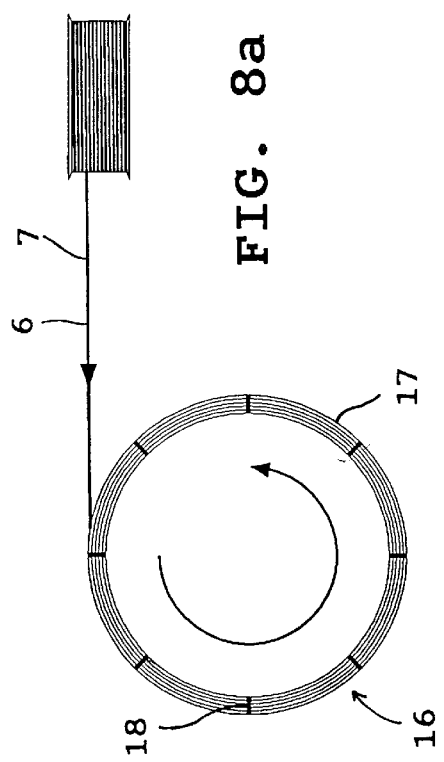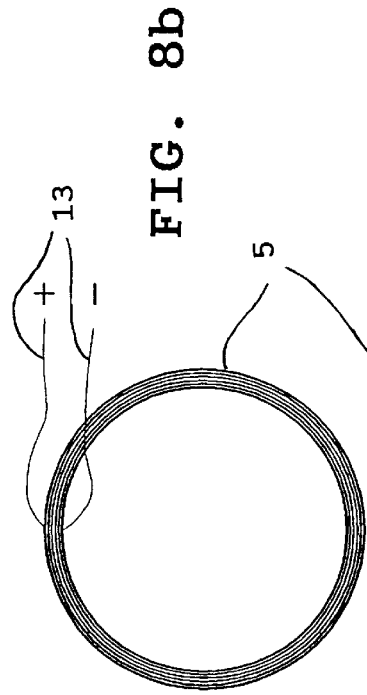

METHOD FOR JOINING SPIRAL WOUND PIPES

This invention relates to a method for joining together thermoplastics pipes made by spiral winding of a hollow profile with mainly rectangular cross section and by welding together the wound rounds located beside each other.

In joining together of spiral wound pipes, a lot of problems are encountered, either as a consequence of the irregular form of the pipe end with an open profile end, or due to a straightly cut pipe end with an end surface having, over most of the periphery of the pipe, a groove-formed recess passing into the helically extending channel of the profile.

In accordance with previously known methods, the joining together of spirally wound pipes has been carried out either by extruder welding from the inside of the pipe, or by pipe sleeve joints. All of these previously known methods tend to require relatively much work. Extruder welding also requires a relatively complicated equipment and the pipe sleeve joints often lead to problems with leaking seams.

The objective of the present invention is to eliminate these problems. This is achieved by using a method characterized by the following stages:

cutting of the profile in the end of the pipe along the inside of that side wall fastened to the nearest preceding wound round and with a section that cuts the end of the profile in a right or an obtuse angle, of equal size for all the pipe ends that are to be joined together, closing the holes in the cut profile ends and preparation of the pipe end surfaces along the entire periphery, positioning two pipes aligned with each other so that the cut profile ends are axially offset, inserting a disc-formed welding ring, matching with the inner and outer diameters of the pipe, in the slot between said two pipes, which welding ring comprises at least one loop of a resistance wire covered by a thermoplastics sleeve, centering the two pipes with an inner and an outer root support around the seam, pressing the pipe ends against each other, connecting the resistance wire of the welding ring to a current source in order to heat the thermoplastics material in the welding ring and the pipe ends so that the thermoplastics material melts down and forms a welding seam, cooling the welding seam, removing the root support and other accessories from the welded pipe, and cutting off the connecting wires of the welding ring.

Using this method, an elegant and simple way to join together spiral wound pipes is provided, resulting in nice, tight, and secure seams. When the outer profile is cut using the method described above, a pipe end is obtained with a double wall thickness, and this will, to a sufficient degree, maintain its rigidity even under the heating process with the welding ring, thus ensuring that a sufficient pressure force can be maintained between the end surfaces of both of the pipes to be joined together.

Other characteristics of the invention will become evident by studying the attached, dependent claims 2 to 10.

Figure 1:
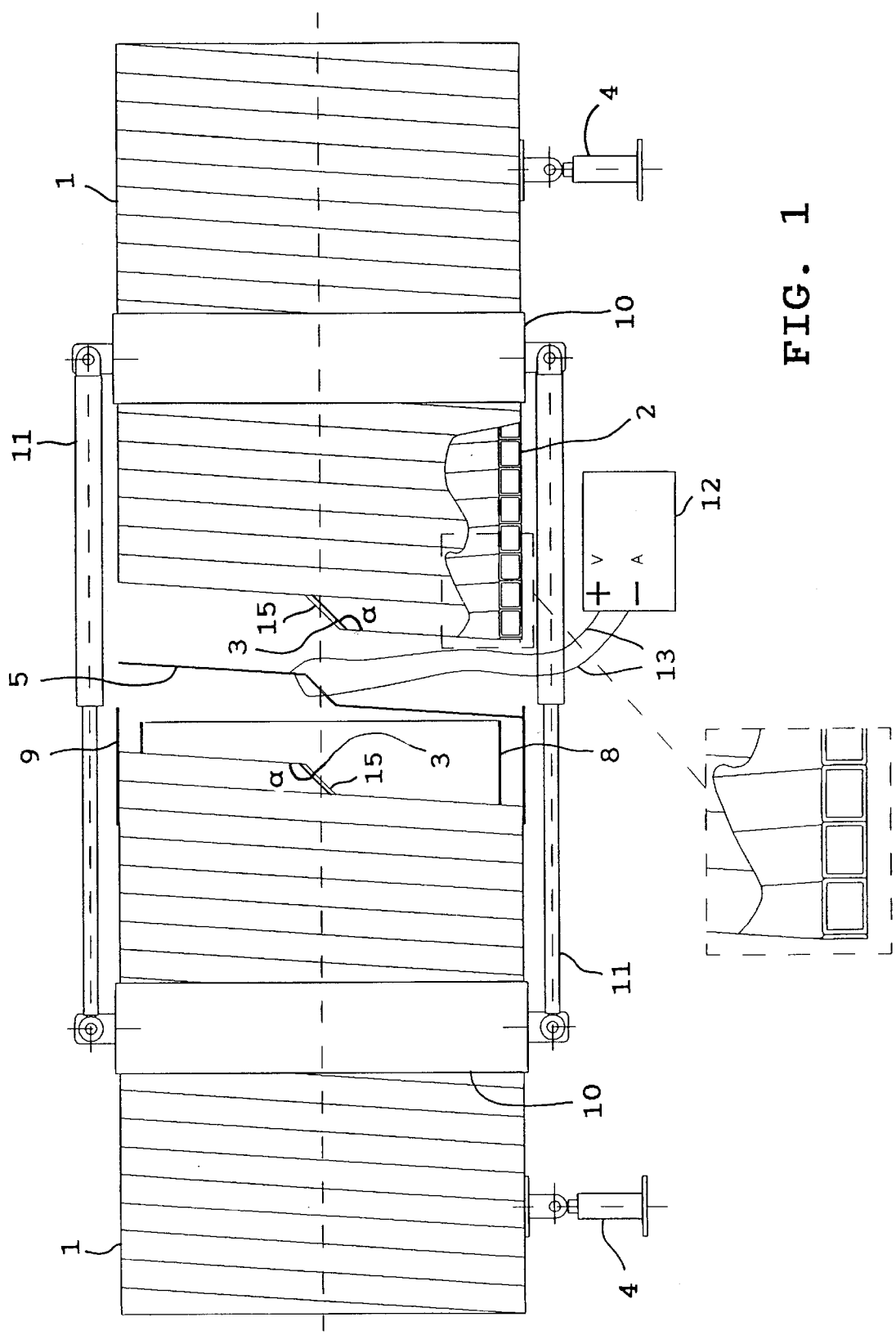
Figure 2:
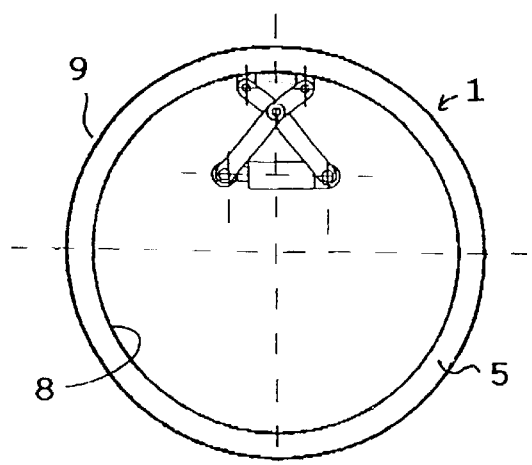
Figure 3:
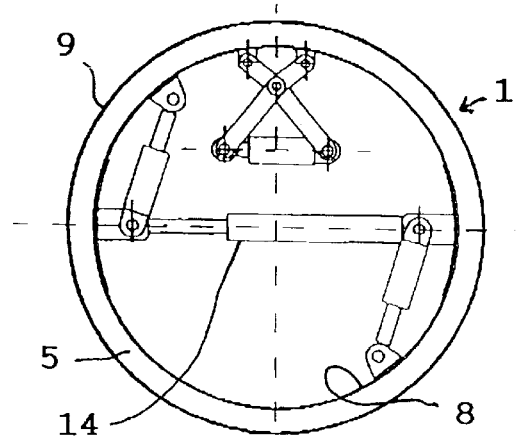
Figure 4:
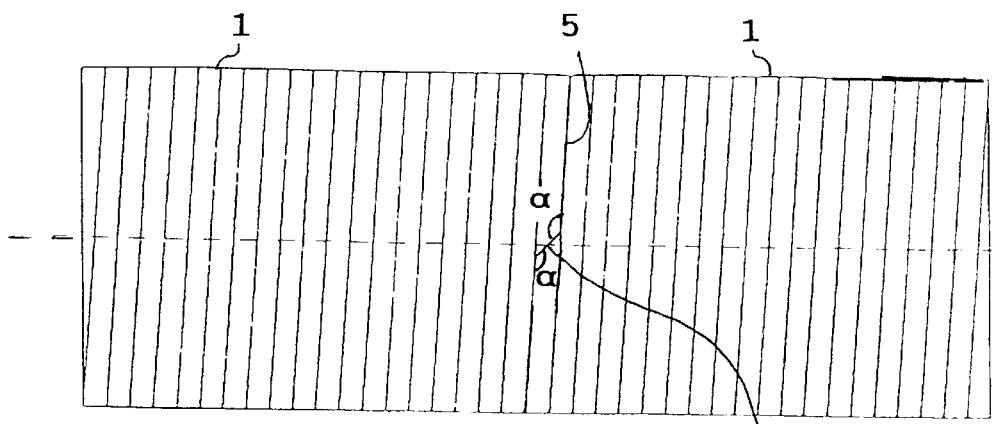
Figure 5:
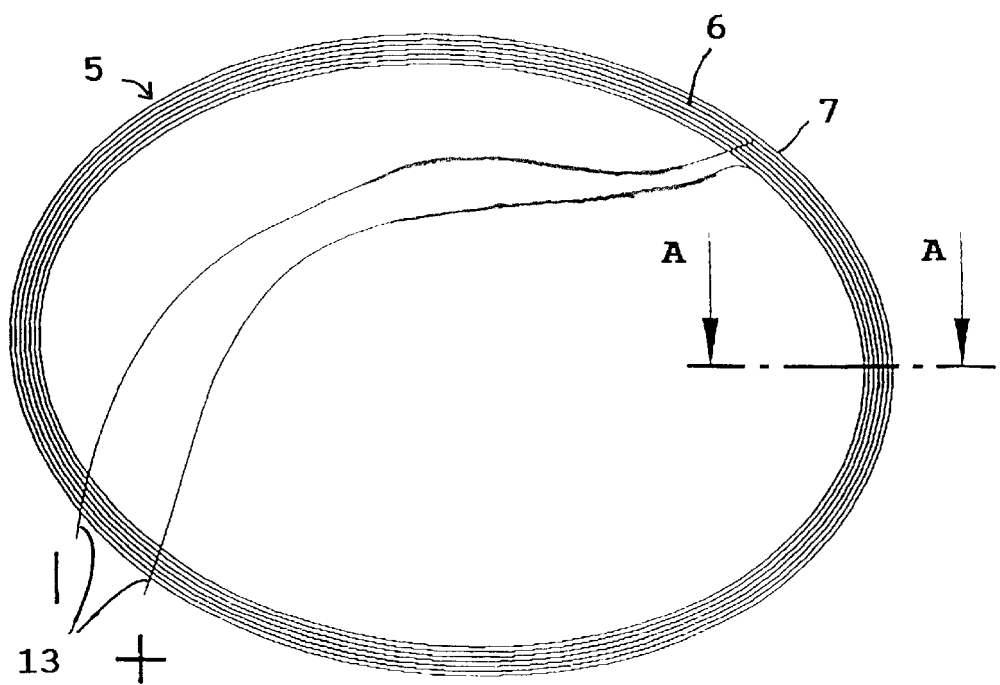
Figure 6:
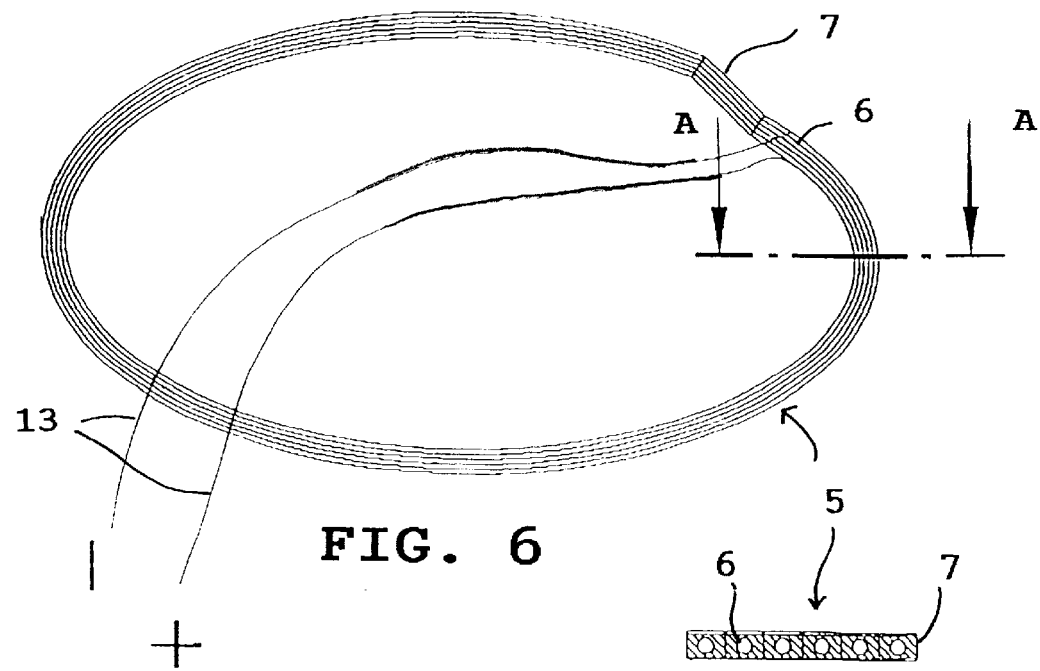
Figure 7:
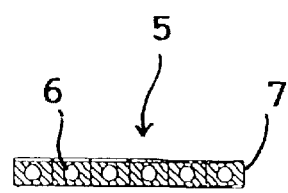

The invention is described in more detail with reference to the attached drawing where FIG. 1 shows a principle sketch at a stage of the method in accordance with this invention, when all components are installed and before any pressure force is directed to the pipe ends, FIG. 2 shows an end view of the stage of the method in FIG. 1, FIG. 3 shows an end view of another embodiment of the method in accordance with this invention, FIG. 4 shows a completed joint made in accordance with this invention, FIG. 5 shows an example of a welding ring in accordance with this invention, seen in perspective, FIG. 6 shows a section A—A through the welding ring in FIG. 4 and/or FIG. 5, FIG. 7 shows another example of a welding ring in accordance with this invention, FIGS. 8a to 8g show a principle sketch of making a welding ring in accordance with FIG. 6.

Two thermoplastic pipes 1, that are made by spiral winding a hollow profile 2 with a mainly rectangular cross section, and by welding together every wound round to the nearest located preceding wound round, are joined together in accordance with this invention in the following way:

The pipe ends to be joined together are cut along the inside of the side wall of the spiral wound profile 2 that is fastened to the nearest preceding wound round of the profile, mainly around the entire periphery of the pipe and with a section 3 that cuts the end of the profile 2 in a right or obtuse angle α which angle has to be of equal size for both pipe ends. The hole in the cut end of the profile 2 is closed with thermoplastics material and the entire pipe end surface is prepared to present an even surface. Thereafter, the two pipes 1 are positioned aligned with each other and carried by adjustable pipe supports 4, so that the cut profile ends 3 are set axially offset in relation to each other. A disc-formed welding ring 5 is inserted in the slot between the two pipe ends. Its dimensions are matched with the inner and outer diameters of the pipe. The welding ring 5 comprises at least one loop of a resistance wire 6 covered by a thermoplastics sleeve 7. Thereafter, the pipe ends are aligned, using an inner root support 8 and an outer root support 9 around the seam with the welding ring 5. These root supports 8, 9 ensure that an absolutely even seam surface is obtained and, at the same time, they prevent the resistance wire 6 of the welding ring 5 from protruding out from the seam during subsequent treatment stages. Both pipes 1 have beforehand been provided with a pipe clamp 10, which pipe clamps 10 are connected to each other by hydraulic cylinders 11 arranged to press the pipe ends against each other. The resistance wire 6 of the welding ring is connected to a current source 12 to heat the thermoplastics material in the welding ring 5 and the end surfaces of the pipes 1 so that the thermoplastics material melts down to form a welding seam, whereafter the welding seam is cooled down and the root supports 8, 9 and other auxiliary accessories 10, 11 are removed from the pipe 1 welded together at the same time as the connecting wires 13 between the welding ring 5 and the current source 12 are cut off, after which the joint is completed.

When the ends of the profile 2 are cut with a section cutting the profile perpendicularly, the pipe ends have, in addition to a compressive force pressing the pipe ends together, also to be subjected to a torsional force, e.g. by using a torsion cylinder arrangement 14, as shown in FIG. 3, in order to obtain a necessary compressive force between the cut profile ends 3. The torsion cylinder arrangement 14 comprises a diagonally directed cylinder, arranged to be prestressed and fastened to one of the pipes 1, and two torsion cylinders fastened to the respective ends of said cylinder, which torsion cylinders are arranged to exert a torsion force between the both pipes 1. Hereby, the welding ring 5 must in advance be bent so that it precisely follows the form of the pipe end with the cut profile end 3.

By cutting the profile end 3 with a section cutting the profile 2 in an obtuse angle, such an advantage is reached that a sufficient compressive force is obtained, also between the cut profile ends, by using only the hydraulic cylinders 11, which will considerably facilitate the joining operation. The bigger the angle α is, the better the welding result will be. Very good results can be obtained if the angle α is 135° or 150°. Hereby, also fully flat, somewhat flexible welding rings 5 can be used, which completely match the form of the pipe ends, when the pipe ends are pressed together.

According to a preferred embodiment the closing of the hole in the profile end 3 is carried out by using a thermoplastics plate 15 that is welded to the cut end surface 3 of the profile 2. To further ensure an absolute tightness of the seam, extruded thermoplastics mass can be supplied to the concave angle between the cut profile end 3 provided with the thermoplastics plate 15 and the profile wall in the end surface of the pipe 1, and simultaneously the outer convex angle between said thermoplastic plate 15 and the profile wall in the end surface of the pipe 1 can be somewhat rounded off.

The welding ring 5 used in the method in accordance with the present invention can suitably be produced by extruding a thermoplastic sleeve 7 around a painted resistance wire 6. The thermoplastic sleeve 7 may have a quadratic, a rectangular, as in FIG. 7, or a round profile. The obtained thermoplastics covered resistance wire 6 is wound spirally on a removable spool 16 (FIG. 8a) the core of which having a diameter corresponding to the inner diameter of the pipe 1 and a length corresponding to the width of the thermoplastics sleeve, the flanges 17 of which are provided with radially directed slots 18 through which the spirally wound windings of the welding ring 5 are joined together by welds, whereby a welding ring in accordance with FIGS. 5 and 8b is obtained, showing a profile in accordance with 8c.

If the welding ring 5 must be bent beforehand, this can preferably be carried out between two pressing plates 19, as indicated in FIGS. 8d and 8e, which pressing plates 19 have a form matching with that of the end surfaces of the pipes to be joined together. The pressing results in a welding ring in accordance with FIG. 6, respectively 8f, and 8g.

By pipes with bigger diameter, the welding ring 5 can be made either of two concentrically arranged discs where the connecting wires 13 of the outer disc are drawn to the outer periphery of the disc, and the connecting wires 13 of the inner disc to the inner periphery of the disc. Alternatively, the welding ring 5 may comprise two separate loops of resistance wires 6, an inner and an outer, which are connected to their respective current sources, or to a current source with several outputs.

What is claimed is:

1. A method of joining thermoplastics pipes (1) made by spiral winding of a hollow profile (2) with mainly rectangular cross section, characterized by the following stages:

cutting an end of the pipe to be joined along an inside of a profile side wall that is fastened to a nearest preceding wound round of said profile, and with a section (3) that is cutting an outermost end of the profile in a right or an obtuse angle (α), of equal size for all ends of the pipes to be joined together, closing holes in such cut profile ends (3), and preparing the end surfaces of the pipes (1) to be joined along their entire peripheries, to present an even surface, positioning the two pipes (1) in alignment with each other so that the cut profile ends (3) are axially offset, inserting a disc-formed welding ring (5), having dimensions matching with the inner and outer diameters of the pipes; between the two pipes (1) to be joined, which welding ring comprises at least one loop of a resistance wire (6) covered by a thermoplastics sleeve (7), centering the two pipes (1), with an inner root support (8) and an outer root support (9) around the welding ring (5) and adjacent pipe ends, pressing said pipe ends together against each other, connecting the resistance wire (6) of the welding ring to a current source (12) for heating the thermoplastics material in the welding ring (5) and the thermoplastics material in the adjacent pipe ends so that the thermoplastics materials melt and form a welding seam, cooling the welding seam, removing the root supports (8, 9) and other accessories (10, 11) from the pipe welded together, and cutting off connecting wires (13) of the welding ring.

2. A method in accordance with claim 1, characterized in that the angle (α) in which the profile ends are cut is 135°.

3. A method in accordance with claim 1, characterized in that the angle (α) in which the profile ends are cut is 150°.

4. A method in accordance with claim 1, characterized in that closing of the holes in the profile ends (3) is carried out by welding a plastics plate (15) on the cut profile end (3).

5. A method in accordance with claim 4, characterized in that the concave inner angle between the cut profile end (3) with the plastics plate (15) and the end surface of the pipe is supplied with extruded thermoplastics mass, and the convex outer angle between the plastics plate (15) and the end surface of the pipe is rounded off.

6. A method in accordance with claim 1, characterized in that the welding ring (5) is flexible and matches with the form of the prepared end surfaces of the pipe ends when the pipe ends are pressed together.

7. A method in accordance with claim 1, characterized in that the welding ring (5) is bent beforehand between two pressing plates (19) to the same form as the pipe ends to be joined together.

8. A method in accordance with claim 1, characterized in that the pipes (1) are, in addition to the force pressing them together, also exerted to a torsion force in order to obtain a compressive force between the cut profile ends (3) of the pipe ends.

9. A method in accordance with claim 1, characterized in that the welding ring (5) is manufactured by extruding a thermoplastics sleeve (7) around a painted resistance wire (6) and by spirally winding the obtained thermoplastics covered resistance wire on a removable spool (16) the core of which having a diameter corresponding to the inner diameter of the pipe (1), and a length corresponding to the width of the thermoplastics sleeve (7), and flanges (17) of which are provided with radially directed slots (18), through which the in spiral form wound windings of the welding ring (5) are joined together with each other by welds.

10. A method in accordance with claim 1, characterized in that the welding ring (5) is wound by a radially inner and a radially outer profile loop (6), connecting wires of which are led, respectively, to the inner and the outer peripheries of the welding ring (5).

* * * * *